United States Patent [19]

Kreft

[11] Patent Number: 4,546,524

[45] Date of Patent: Oct. 15, 1985

[54] HOSE CLAMP APPARATUS

[76] Inventor: Brad W. Kreft, 3502 A Gardens East Dr., Palm Beach Gardens, Fla. 33410

[21] Appl. No.: 584,777

[22] Filed: Feb. 29, 1984

[51] Int. Cl.⁴ .................................................. B65D 63/00
[52] U.S. Cl. ........................ 24/274 R; 24/274 WB; 24/269; 24/19; 285/253
[58] Field of Search ............. 24/274 R, 274 WB, 269, 24/19, 20 LS; 285/253

[56] References Cited

U.S. PATENT DOCUMENTS

| | | | |
|---|---|---|---|
| 1,745,279 | 1/1930 | Skinner | 24/269 |
| 1,874,731 | 8/1932 | Younce | 24/274 R |
| 1,963,436 | 6/1934 | Dumke | 24/269 |
| 1,978,646 | 10/1934 | Oishei et al. | 24/269 |
| 2,091,916 | 8/1937 | Evans | 24/19 |
| 2,383,199 | 8/1943 | Kitts | 24/19 |
| 2,395,273 | 2/1946 | Hill et al. | 24/19 |
| 2,616,644 | 11/1952 | Christophersen | 24/19 |
| 2,641,817 | 6/1953 | Brodheim | 24/269 |
| 2,944,314 | 7/1960 | Black | 24/279 |
| 3,195,204 | 7/1965 | McKown, Jr. | 24/274 R |
| 3,214,809 | 11/1965 | Edwards | 24/274 WB |

FOREIGN PATENT DOCUMENTS

| | | | |
|---|---|---|---|
| 1256422 | 2/1961 | France | 24/274 R |
| 516032 | 12/1939 | United Kingdom | 24/19 |

Primary Examiner—Victor N. Sakran
Attorney, Agent, or Firm—Dick and Harris

[57] ABSTRACT

An improved hose clamp apparatus for alternatively clamping, tightening and/or release of a hose associated with a collar of an engine, motor, pump or the like, in tightly confined or constricted spaces most accessible primarily from a direction substantially parallel to the hose comprising, a rotatable geared shaft engaging and driving corresponding transverse slots formed in a flexible band surrounding the hose being clamped. When a sufficient axial force component is supplied to the shaft so as to defeat the spring biasing force and disengage a shaft member, rotation thereof is possible so as to alter the circumference of the flexible band and correspondingly loosen or tighten the clamp apparatus about the hose fitted upon the collar.

11 Claims, 6 Drawing Figures

HOSE CLAMP APPARATUS

BACKGROUND OF THE INVENTION

The present invention relates generally to hose clamping devices and particularly an improved hose clamp apparatus for alternative clamping, tightening and/or release of a hose associated with a collar of an engine, motor, pump or the like, in tightly confined or constrained spaces most accessible primarily from a direction substantially parallel to the hose.

Various devices currently exist that attempt to securely affix hoses to engines, motors, pumps or the like. One type of hose clamp employs a tangentially positioned worm screw gear such as the devices patented in Hill et al., U.S. Pat. No. 2,395,273 and Black, U.S. Pat. No. 2,944,314. However, such "tangential" type hose clamps are difficult to work with in the often tightly confined or constricted spaces which form the environments in which they are most commonly used, such as automobile or truck engine compartments.

Other types of hose clamps have included those such as Kitts, U.S. Pat. No. 2,383,199 and Younce, U.S. Pat. No. 1,874,731, a "piston ring compressing tool", both of which employ a screw head oriented substantially parallel to the central longitudinal axis of the circular band for tightening thereof. However, Kitts U.S. Pat. No. 2,383,199 employs a separate pawl and ratchet arrangement or an eccentric wedging member, to lock the clamp apparatus, while Younce U.S. Pat. No. 1,874,731 employs a loop which is tightened down so as to contact the shaft to purportedly restrain rotation thereof. Indeed, difficulties are likely to be encountered in connection with the separate operations and/or tools or "two handed" operations required to achieve tightening and reliable locking, if at all, of the Younce and Kitts devices.

Often in the engine compartments of modern trucks or cars there are numerous hoses and the like which must be clamped and maintained in a tight fashion to such items as radiators, pumps, or pipes. However, the mechanical complexity, close physical proximity of the various components associated with the engine, and limited available space in such engine compartments combine to make for an environment wherein access to such hose clamps, which invariably must be periodically tightened or removed, is often severly limited or virtually impossible. Indeed, often in order to obtain sufficient access to a conventional hose clamp in order to tighten, loosen or to remove it entirely with a screw driver or similar tool, it is necessary to remove entire engine components for no other reason than to obtain sufficient clearance to engage and remove or tighten the clamp or hose. However, the present invention provides much more facilitated tightening, loosening or removal of the clamp and hose since it is almost always possible to engage the shaft member of the present invention with a conventional tool since it is oriented approximately parallel to the central longitudinal axis of the hose being clamped, thereby avoiding the necessity of removing surrounding components which would serve as obstructions if conventional tangential hose clamps were employed.

Clearly, there is therefore a need for an improved hose clamp apparatus for alternative clamping, tightening and/or release of a pressurized hose associated with a collar of an engine, motor, pump or the like in a tightly confined or constricted environment most accessible primarily from a direction substantially parallel to the hose and providing for facilitated "one handed" tightening and untightening thereof.

Consequently, the present invention has as an object the accomplishing of the purpose of providing a hose clamp apparatus that will easily maintain a desired tightness of a hose connection.

In addition, the present invention has as an object the facilitation of access to the rotatable shaft member from a direction substantially parallel to the central longitudinal axis of the hose for loosening or tightening thereof, so as to prevent obstruction by other components and corresponding unnecessary removal and replacement of such components in the aforementioned constricted environment.

It is a further object of the present invention to provide a hose clamp apparatus which allows for facilitated "one handed" tightening and loosening in a substantially continuous manner as opposed to tightening or loosening requiring two separate steps and/or tools.

These and other objects of the invention will become apparent in light of the present specification and drawings.

SUMMARY OF THE INVENTION

The invention comprises an improved hose clamp apparatus for alternative clamping, tightening and/or release of a hose from about an internally positioned collar in an engine, motor, pump or the like, and particularly ones in tightly confined or constricted spaces most accessible primarily from a direction substantially parallel to the hose. The improved hose clamp apparatus is comprised of hose surrounding means including a flexible band means substantially continuously encircling the hose so as to interpose the hose between the flexible band means and the internally positioned collar, as well as clamp tightening means operably associated with the hose surrounding means so as to be capable of alternatively tightening the clamp apparatus from about the hose by alternatively reducing and increasing the circumference of the flexible band which surrounds the hose being clamped.

The clamp tightening means in the present invention includes adjustment means which are oriented substantially parallel to the central longitudinal axis of the hose being clamped. Tightness locking means are also operably connected to tightening means and the flexible band means for maintenance of the desired flexible band means in a desired set circumferencial position. Moreover, the flexible band means, clamp tightening means, and the tightness locking means cooperate to allow selective tightening and loosening of the flexible band means simultaneous with the disengagement and engagement of the tightness locking means at a position substantially parallel to the central axis of the clamped hose through the adjustment means. The adjustment means responds to force in an axial direction to alternatively move to said engaged and disengaged positions and responds to force in a rotational direction to alternatively tighten or loosen the clamp apparatus. Locking and maintenance of the achieved tightness is accomplished by release of the axial force component.

The hose surrounding means includes a flexible band means including a band capable of extending substantially about the periphery of the hose being clamped so as to enable overlapping of first and second layers thereof. In addition, the flexible band is provided with a plurality of substantially transverse slots formed along at least a portion of its length in said second layer with said portion being positioned immediately below the clamp tightening means. The clamp tightening means of the present invention includes a housing having a front and rear wall and a slotted region at its lower end, and being operably affixed to the slotted band first layer so as to permit the second layer of the slotted band to pass therethrough. A shaft member is oriented and is translatable along an axis substantially parallel to the central longitudinal axis of the hose being clamped.

Moreover, the second layer of the flexible band can and does pass through the housing between the shaft member and the remainder of the overlapped flexible band. The shaft member is further provided with one or more gear teeth arranged about its periphery along a portion of its length. The gear teeth of the shaft member are capable of engaging the plurality of substantially transverse slots formed in the flexible band so as to change the amount of the overlap between the second layer of the flexible band and the remainder of the band when the shaft is rotated so as to correspondingly reduce or increase the circumference of the flexible band to tighten or loosen the clamp apparatus. In addition, the shaft member is mounted within the housing so as to be capable of both translatable and rotatable motion. In addition, the shaft member has a head configuration at one end capable of being engaged by a correspondingly shaped tool.

The tightness locking means of the preferred embodiment of the present invention includes one or more gear engagement members operably affixed to the housing and capable of preventing rotation of the shaft member when the shaft member is in the engaged position. Moreover, in the preferred embodiment an elastically compressible member or spring is interposed between the shaft member and one of the walls of the housing so as to exert a biasing force upon the shaft member which biases the shaft member towards the engaged position. In operation, when an axial force component sufficient to defeat the spring biasing is applied to the shaft member so as to disengage it from the gear engaging means, the shaft member is then rotatable and resultingly capable of changing the circumference of the flexible band. In addition, the biasing force of the spring member serves to return the shaft member to the engaged position when the axial force component is eliminated.

In the preferred embodiment, the gear engagement members comprise one or more flanges depending from the interior of the housing in position so as to engage and retain one or more of the gear teeth of the shaft. However, the gear engagement members could also comprise one or more peg members passing through the housing and into the interior thereof, positioned so as to be interposable between and restrain the gear teeth of the shaft when in the engaged position.

The clamp tightening means in the preferred embodiment further comprises front and rear walls of the housing having apertures formed therein for mounting of the shaft member. The shaft member head being rotatably and translatably mounted and extending past the housing front wall aperture. Similarly, the shaft member second end is rotatably and translatably mounted upon and extending past the housing rear wall aperture. The shaft member further comprises zones of intermediate diameter between the first and second ends of the shaft member and juxtaposed on either side of the gear toothed portion. The gear toothed portion of the shaft member is of a larger diameter than the zones of intermediate diameter.

The tightness locking means in the preferred embodiment further comprises one or more of the gear engagement members being positioned proximate the housing front wall. The zone of intermediate diameter of the shaft member proximate the housing front wall is of a small enough diameter so as to avoid contacting the gear engagement members when the tightness locking means is in the disengaged position and the shaft is rotated. Furthermore, the gear engagement members are of sufficient length to be interposable between the gear teeth when the tightness locking means is in the engaged position.

The shaft head configuration of the present invention can correspond to a conventional slotted screw head, "Phillips" type screw or a multi-sided indented configuration such as an "Allen" type screw head capable of being engaged by a correspondingly shaped tool. Moreover, the hose surrounding means can further include a substantially smooth shield portion interposed between the slotted portion of the flexible band and the hose being clamped. Similarly, the flexible band can be comprised of a continuous band having a slotted rack affixed along the top of its periphery so as to comprise, in effect, a slotted band.

DETAILED DESCRIPTION OF THE DRAWINGS

Figure 2:
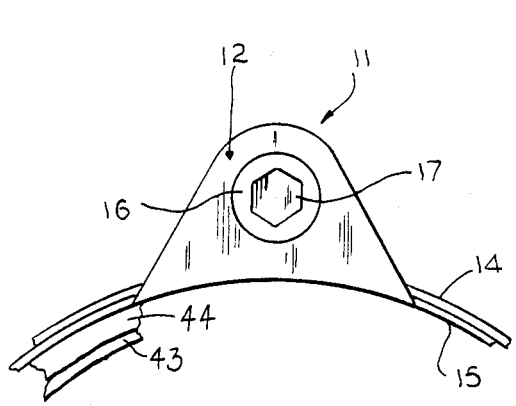
FIG. 2 is a side elevational view showing in greater detail the overlapping of the two portions of the flexible band, and the shaft member being held within the housing.

While this invention is susceptible of embodiment in many different forms, it is shown in the drawings and will herein be described in detail, once specific embodiment, with the understanding that the present disclosure is to be considered as an exemplification of the principles of the invention and is not intended to limit the invention to the embodiments illustrated.

Figure 1:
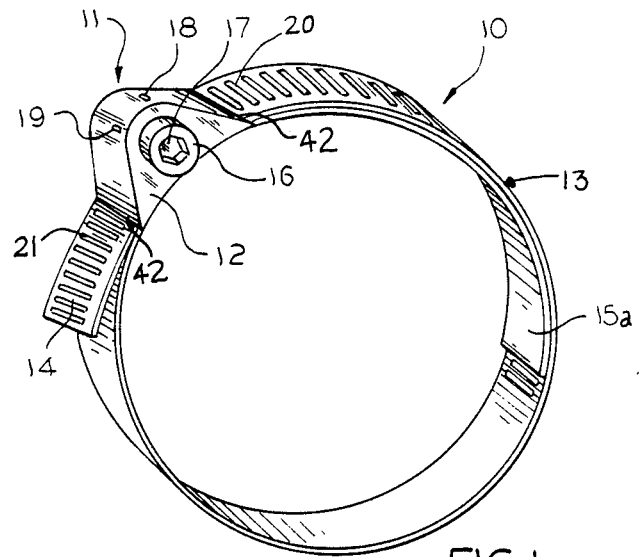
FIG. 1 is a perspective view of the improved hose clamp apparatus illustrating in particular, the flexible band having slots along at least a portion of its length and passing through the housing containing the shaft member and the tightness locking means.

The preferred embodiment of the present invention, an improved hose clamp apparatus 10 (hereinafter referred to as "clamp apparatus 10") for alternative clamping, tightening and/or release of a hose, surrounding the hose at the point of connection, to a collar of an engine, motor, pump, turbine or the like, and particularly in a tightly confined or constricted space accessible primarily from a direction substantially parallel to the central axis of the hose being clamped is illustrated in various views both externally and internally in FIGS. 1 through 6. FIG. 1 illustrates clamp apparatus 10 including clamp tightening means 11 comprised of housing 12 and adjusting means including shaft member 16 having screw head configuration 17 thereon, as well as flexible band 13 passing therethrough which serves to surround the outer periphery of the hose to be clamped proximate its zone of affixation to a collar 43 of an engine, motor, turbine, pump or the like.

As shown in FIG. 1, shaft member 16 of clamp tightening means 11 is oriented approximately parallel to the central longitudinal axis of the hose being clamped. Flexible band 13 is provided with a plurality of substantially transverse slots such as slots 20 and 21. Flexible band second layer 14 passes through bottom slotted region 42 of housing 12 and, in a manner to be described in greater detail hereinafter, has its slots such as slots 20 and 21 operably engaged by shaft member 16 mounted therein. As shaft member 16 is rotated in a clockwise direction with respect to FIG. 1, the slots proximate slots 20 will, in turn, be driven through housing 12 until they exit on the same side as slots 21, so as to decrease the circumference of band 13 and tighten the clamp apparatus 10 about the hose being clamped. Conversely, if shaft member 16 is rotated in a counter-clockwise direction with respect to FIG. 1, the slots proximate slots 21 will in turn pass through and exit from slots 42 in housing 12, ending up on the same side of housing 12 as slots 20 so as to result in an increase in the circumference of band 13 and corresponding loosening of clamp apparatus 10 surrounding the hose being clamped.

As further shown in FIG. 1, in the preferred embodiment, flexible band second layer 14 overlaps the remaining portion, first layer 15, of flexible band 13. Flexible band 13 serves as part of the hose surrounding means and is alternatively tightened or loosened around the spot where the hose 44 is joined to the collar 43 of the engine, motor, pump or the like by alteration of the circumference of overlapped flexible band 13 by the adjustment means of the clamp tightening means 11. Since ordinarily the series of substantially transverse slots such as slots 20 and 21 along a portion of the periphery of flexible band 13 would be directly contacting and surrounding the hose being clamped (not shown in FIG. 1) it is preferable that the remaining portion, first layer 15, of flexible band 13 be substantially smooth. However, as shown in FIG. 1 it is also considered as being within the scope of this invention to provide for remaining portion 15 of flexible band 13 to be a smooth shield 15A affixed to the underside of flexible band 13 and interposed between the slotted second layer 14 of band 13 and the hose 44 being clamped to accomplish the same result. Also shown in FIG. 1 are gear engaging members 18 and 19 which, as will be described in greater detail hereinafter, assist in maintaining the desired circumference of flexible band 13 so as to maintain the desired tightness of clamp apparatus 10 upon the hose being clamped.

Likewise shown in FIG. 2 is housing 12 having shaft member 16 mounted therethrough and in turn having screw head configuration 17 on its exterior so as to allow activation and corresponding tightening or loosening through the use of a tool having a correspondingly shaped portion. Clamp tightening means 11 serves to move flexible band second layer 14 with respect to remaining portion, first layer 15, of flexible band 13 so as to alter the amount of overlap and therefore the circumference of flexible band 13, in order to selectively tighten or loosen the clamp apparatus 10.

Figure 3:
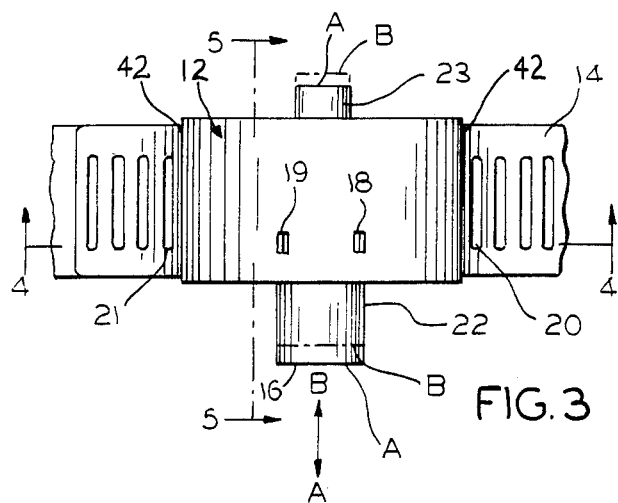
FIG. 3 is a partial top view showing in particular the slotted portion of the flexible band passing through the housing, the tightness locking means as well as engaged position A of the shaft member and, in phantom, the disengaged position B of the shaft member.

As shown in FIG. 3, shaft member 16 is translatably and rotatably mounted within housing 12. Shaft 16 is capable of translational motion along an axis substantially parallel to the center of the flexible band 13 and the hose 44 which it surrounds. As shown in FIG. 3, when shaft member 16 is in position A (the "engaged position"), gear engaging members 18 and 19 serve to restrict shaft 16 from rotating and correspondingly from tightening or loosening band 13. However, when shaft 16 is in position B (the "disengaged position", shown in phantom) gear engaging members 18 and 19 no longer restrict or prevent rotation of shaft 16 so as to allow tightening or loosening of band 13. Further shown in FIG. 3 are substantially transverse slots 20 and 21 formed through flexible band second layer 14 and passing through slots 42 of housing 12. Shaft 16 is further comprised of shaft head 22 and shaft second end 23.

Figure 4:
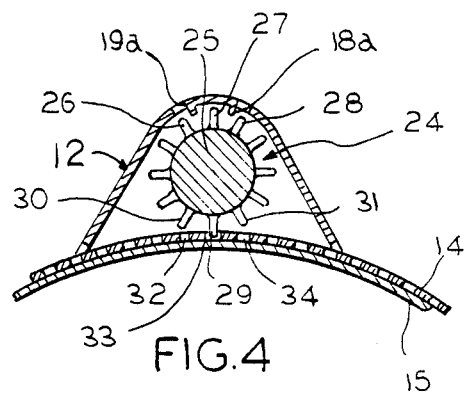
FIG. 4 is a partial cross-sectional view along line 4—4 of FIG. 3 and in the direction of the arrows showing in particular one of the gear teeth of the shaft member engaging one of the slots of the overlapped flexible band, as well as the gear engagement members interposeable between the gear teeth positioned about the periphery of the shaft member.
Figure 5:
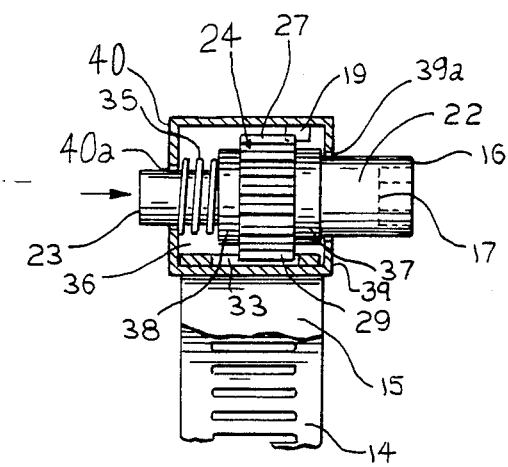
FIG. 5 is a cross-sectional view taken along 5—5 of FIG. 3 and in the direction of the arrows, illustrating the interior of the housing and in particular, the shaft member in an engaged position with a gear engagement member interposed between two of the gear teeth arranged about the periphery of the shaft member, as well as the spring member interposed between the rear wall of the housing and one of the zones of intermediate diameter of the shaft member so as to bias it towards the engaged position.
Figure 6:
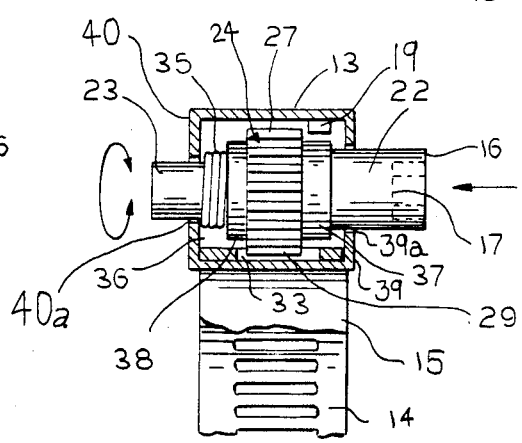
FIG. 6 is a cross-sectional view likewise taken along line 5—5 of FIG. 3 and in the direction of the arrows, of the improved hose clamp apparatus in the disengaged position showing, in particular, compression of the spring member as a result of an axial load being placed upon the shaft member and corresponding translational motion thereof, so as to disengage the gear engagement members from the gear teeth positioned along the periphery of the shaft member and correspondingly compress the spring member, thereby permitting the gear teeth engaging the slots formed in the flexible band to alter or decrease the circumference thereof by increasing or decreasing the amount of overlap in the flexible band, when a rotational force is applied to the shaft member.

A cross-sectional view of the interior of housing 12 taken along 4—4 of FIG. 3 in the direction of the arrows, is provided in FIG. 4, specifically showing gear toothed portion 24 of shaft member 16 including gear teeth 26, 27, 28, 29, 30 and 31 affixed to and arranged about the periphery of shaft core 25. Flexible band second layer 14 passes between and is engaged by, gear toothed portion 24 of shaft member 16 and remaining portion, first layer 15, of flexible band 13 through housing 12. As shown in FIGS. 4 through 6, gear tooth 29 of shaft 16 engages slot 33 of flexible band 13. Therefore, it shaft member 16 is disengaged from gear engaging members 19 and 18 so as to permit rotation thereof in a clockwise direction with respect to FIG. 4, gear tooth 29 will serve to move flexible band second layer 14 to the left, so as to increase the amount of overlap between flexible band second layer 14 and remaining portion, first layer 15, of flexible band 13, resultingly having the effect of tightening clamp apparatus 10. Continued clockwise rotation of shaft 16 will then result in next proximate gear tooth 31 engaging next proximate slot 34 in flexible band second layer 14, so as to allow for continued tightening of clamp apparatus 10 as shaft member 16 is rotated. As rotation of shaft member 16 continues, the next proximate gear tooth engages the next proximate slot on band second layer 14, causing it to translate with respect to the remainder 15 of band 13.

Conversly, as shaft member 16, in the disengaged position, is rotated in a counterclockwise direction with respect to FIG. 4, gear tooth 29 operably engaged to slot 33 will serve to move flexible band second layer 14 to the right with respect to FIG. 4, so as to reduce the amount of overlap between flexible band second layer 14 and the remaining portion 15 of flexible band 13 and resultingly increasing the circumference of flexible band 13 and thereby loosening clamp apparatus 10. Continued rotation of shaft member 16 while disengaged from gear engaging members 18 and 19 will result in next proximate gear tooth 30 engaging slot 32 of flexible band second layer 14 so as to allow for the continuation of the above-described process of loosening or tightening of clamp apparatus 10 as shaft member 16 is rotated.

FIG. 5 of clamp apparatus 10 in the engaged position shows in greater detail housing interior 36 in a cross-sectional view taken along line 5—5 and in the direction of the arrows of FIG. 3, showing shaft member 16 rotatably and translatably mounted therein and spring biased by spring member 35 towards the engaged position of gear toothed portion 24 with respect to gear engaging members 18 and 19. Housing 12 has a front wall 39 and front wall aperture 39a through which shaft head 22 extends. Similarly, housing 12 has a rear wall 40 and a rear wall aperture 40a formed therethrough, through which shaft member second end 23 extends. Moreover, housing 12 has slots 42 proximate its bottom portion which permit band 13 to pass therethrough. As shown in FIG. 5, gear tooth 29 of gear toothed portion 24 of shaft member 16, is received by slot 33 of flexible band second layer 14, so as to allow tightening or loosening of the clamp apparatus upon disengagement from gear engaging members 18 and 19 of shaft member 16 and rotation thereof. Shaft member 16 is further provided in the preferred embodiment with zones of intermediate diameter 38 and 39 positioned on both sides of gear toothed portion 24. Though the present embodiment illustrates gear tooth 29 of shaft member 16 fully received within slot 33 of band 13 when in the engaged or locked position, it is likewise considered to be within the scope of the invention for gear tooth 29 to only partially engage slot 33 when in the engaged position.

Interposed between housing rear wall 40 and zone of intermediate diameter 38 is an elastically compressible member or spring member 35 serving normally to bias shaft member 16 into engagement with gear engaging members 18 and 19. As shown in FIGS. 4 and 5, gear engaging members 18 and 19 are interposed between gear teeth 26, 27 and 28 so as to prevent rotation of shaft member 16 and thereby maintain the circumference of band 13 and therefore the corresponding tightness of clamp apparatus 10, when shaft member 16 is in the engaged position. When in such an engaged position, gear engagement members 18 and 19 will prevent shaft member 16 from rotating and in particular will prevent gear tooth 29 first, and then in turn the next proximate gear teeth, from moving flexible band second layer 14 with respect to remaining portion of first layer 15 of flexible band 13.

FIG. 6 of clamp apparatus 10 in the disengaged position, is likewise a cross-sectional view of clamp apparatus 10 taken along line 5—5 and in the direction of the arrows of FIG. 3 illustrating shaft member 16 in the disengaged position with respect to gear engaging members 18 and 19. Specifically, upon application of an axial force to shaft head 32 sufficient to overcome the outward biasing force and compress spring member 35 resulting in translation of shaft member 16 along an axis substantially parallel to the central axis of flexible band 13 and the hose 44 which it serves to surround. Gear toothed portion 24 of shaft member 16 is thereby disengaged from gear engaging members 18 and 19 so as to permit rotation of shaft member 16, having gear tooth 29 received within slot 33 of flexible band first end 14, to correspondingly move flexible band second layer 14 with respect to remainder 15 of flexible band 13 so as to alter the circumference of flexible band 13 and thereby tighten or loosen clamp apparatus 10.

The biasing force supplied by spring 35 should be great enough to return shaft 16 to the engaged position with respect to gear engaging members 18 and 19 once the desired tightness of band 13 is reached and the axial force component is released. Flexible band 13 will have a tendency to loosen and in turn rotate shaft 16 when in the disengaged position. Therefore, once the rotational force component and resulting motion imparted to shaft 16 by a tool (not shown) is stopped, sufficient rotational force should be applied to or maintained upon the tool to resist any tendency of shaft 16 to rotate in the loosening direction while in the disengaged position, until the spring biasing force of spring 35 returns the shaft to the engaged position, with respect to gear engaging members 18 and 19.

Gear engaging members 18 and 19 can be either flanges extending from the top of housing interior 36, as shown herein in the preferred embodiment, or other types of members that are capable of being inserted between such gear teeth as 26, 27 or 28 so as to restrain rotation of shaft 16 when in the engaged position. Gear engaging members 18 and 19 should be of such a configuration as to be able to engage and restrain the gear tooth portion 24 of shaft member 16 in order to prevent undesired rotation thereof, as shown in FIG. 5 with respect to the engaged position, as well as to permit unrestricted rotation of shaft member 16 and sufficient clearance with respect to the zone of intermediate diameter 37 of shaft 16 when in the disengaged position and alternative tightening or loosening of clamp apparatus 10 is desired. The screw head configuration 17 of shaft member 16 is further contemplated to be either of a conventional slotted screw or "Phillips-head" configuration so as to permit operation of the clamp apparatus 10 through the use of a correspondingly shaped screwdriver tool or of a multi-sided configuration similar to an "Allen-head" screw so as to permit activation thereof by a correspondingly shaped tool.

Clamp apparatus 10 therefore permits selective tightening or loosening of flexible band 13 through the use of a single tool oriented substantially parallel to the central axis of the flexible band 13 or hose being clamped by first applying an axial force component to the shaft member 16 so as to disengage it from gear engaging members 18 and 19 and then a rotational force component in the desired direction to alter the circumference of flexible band 13. Upon release of the axial force component, while a sufficient rotational force is maintained to counter the tendency of flexible band 13 and in turn shaft member 16 to unwind or rotate, spring member 35 urges and returns shaft 16 to the engaged position so as to maintain the accomplished degree of tightness.

Flexible band 13, as previously mentioned, serves to substantially surround the outer periphery of the hose (not shown) being clamped and likewise has a series of substantially transverse slots 20 and 21 formed within it. It is further contemplated as being within the scope of the present invention to employ a flexible band configuration wherein a slotted rack is affixed along the periphery of a flexible substantially smooth band so as to in effect comprise a slotted band construction. Moreover, with respect to housing 12 it is contemplated as being within the scope of the present invention to either integrally form housing 12 from a portion of flexible band 13 or to operably affix such a housing 12 thereto. It is further contemplated that walls 39 and 40 of housing 12 can be either integrally formed, welded to or affixed by common fasteners to the remainder of housing 12. Moreover other configurations or constructions of housing 12 or mountings therein that permit translational and rotational movement of shaft 16 and passage therethrough of band 13 are also considered not to depart from the scope of this invention.

While the forgoing presents two specific embodiments of the present invention, it is to be understood that such embodiments are presented by way of example only, and are not intended to limit the invention. It is expected that others will perceive variations which, while different from the foregoing, do not depart from the spirit and scope of the invention as herein described and claimed.

What is claimed is:

1. An improved hose clamp apparatus for alternatively tightening and clamping; or loosening and releasing a hose from about an internally positioned collar in an engine, motor, pump, turbine or the like, and particularly ones in tightly confined or constricted spaces most accessible primarily from a direction substantially parallel to said hose, said apparatus comprising:

hose surrounding means including flexible band means for substantially continuously encircling said hose so as to interpose said hose between said flexible band means and said internally positioned collar;

clamp tightening means operably associated with said hose surrounding means capable of alternatively tightening and loosening said clamp apparatus from about said hose by alternatively reducing and increasing the respective circumference of said flexible band;

said clamp tightening means including adjustment means which are oriented substantially parallel to the central longitudinal axis of said hose being clamped;

tightness locking means operably connected to said tightening means and said flexible band means for maintaining said flexible band means in a desired set circumferential;

said tightness locking means being selectively moveable to an engaged locked and a disengaged unlocked position through manipulation of said adjustment means;

said flexible band means, clamp tightening means adjustment means and tightness locking means cooperating to allow selective tightening and loosening of said flexible band means simultaneous with the disengagement and engagement of said tightness locking means at a position substantially parallel to the central axis of said clamped hose, all through operation of said adjustment means;

said hose surrounding means comprising said flexible band means including a band capable of extending about the periphery of said hose being clamped so as to enable overlapping of first and second layers thereof, and said band having a plurality of substantially transverse slots formed along at least a portion of its length in said second layer with said portion being positioned immediately below said clamp tightening means;

said clamp tightening means comprising a housing having a front wall and a rear wall and forming at its lower end, a slotted region, said housing being operably affixed to said slotted band first layer so as to permit said second layer of said slotted band to slide through said slotted region and, in turn, said housing, said adjusting means including a shaft member being oriented and being translatable along an axis substantially parallel to the central axis of said hose being clamped, said second layer of said flexible band passing through said housing between said shaft member and said first layer of said overlapped flexible band, said shaft member having a plurality of gear teeth arranged about its periphery along a portion of its length;

said gear teeth being capable of engaging said plurality of substantially transverse slots formed in said flexible band so as to change the amount of said overlap between said flexible band second layer and said first layer of said flexible band when said shaft is rotated, so as to correspondingly reduce or increase the circumference of said flexible band to tighten or loosen, respectively, said clamp apparatus, said shaft member having first and second ends being translatably and rotatably mounted through said housing, said shaft member having a head configuration at said first end, capable of being engaged by a correspondingly shaped tool;

said tightness locking means comprising at least one gear engagement members operably affixed to said housing capable of preventing rotation of said shaft member when said tightness locking means are in said engaged position, an elastically compressible member interposed between said shaft member and one of said walls of said housing so as to exert a biasing force upon said shaft member, said shaft member being spring biased towards said engaged position, said shaft member being rotatable and capable of changing the circumference of said flexible band when an axial force component sufficient to defeat said spring biasing is applied thereto and said gear engagement means disengaged, and said biasing force serving to return said shaft member to said engaged position when said axial force component is eliminated.

2. The apparatus as recited in claim 1 wherein said gear engagement members comprise at least one flange depending from the interior of said housing and positioned so as to be interpassable between and retain at least one of said gear teeth of said shaft.

3. The apparatus as recited in claim 1 wherein said gear engagement members comprise at least one peg members passing through said housing into the interior thereof and positioned so as to be interposed between and restrain at least one of said gear teeth of said shaft when in the engaged position.

4. The apparatus as recited in claim 1 wherein said clamp tightening means further comprises:

said front and rear walls of said housing having apertures formed therein for mounting of said shaft member thereat;

said shaft member head being rotatably and translatably mounted and extending past said housing front wall aperture;

said shaft member second end being rotatably and translatably mounted and extending past said housing rear wall aperture;

said shaft member further comprising zones of intermediate diameter between said first and second ends of said shaft member and juxtaposed on either side of said gear toothed portion thereof; and said gear toothed portion of said shaft member being of larger diameter than said shaft member zones of intermediate diameter.

5. The apparatus as recited in claim 4 wherein said tightness locking means further comprises:

said at least one gear engagement member being positioned proximate said housing front wall;

said shaft member zone of intermediate diameter proximate said housing front wall being of a small enough diameter, as to avoid contacting said gear engagement members when said tightness locking means is in the disengaged position and said shaft member is rotated; and said gear engagement members being of sufficient length to be interposeable between said gear teeth when said tightness locking means is in the engaged position.

6. The apparatus as recited in claim 1 wherein said shaft head configuration is that of a conventional slotted screw.

7. The apparatus as recited in claim 1 wherein said shaft head configuration is that of a Phillips-type screw head.

8. The apparatus as recited in claim 1 wherein said shaft head configuration is that of a multi-sided configuration such as an Allen-type screw head.

9. The apparatus as recited in claim 1 wherein said hose surrounding means further includes a substantially smooth shield portion interposed between said slotted second layer portion of said flexible band and said clamped hose.

10. The apparatus as recited in claim 1 wherein said flexible band includes a slotted rack affixed along its periphery so as to comprise a slotted band.

11. The invention according to claim 1 wherein said adjustment means responds to force in an axial direction to alternatively move to said engaged and disengaged positions and responds to force in a rotational direction to alternatively tighten and loosen said clamp apparatus.

* * * * *